US012656546B2

(12) United States Patent
Itakura

(10) Patent No.: US 12,656,546 B2
(45) Date of Patent: Jun. 16, 2026

(54) OPTICAL WAVEGUIDE MODULE AND LIGHT SOURCE MODULE

(71) Applicant: KYOCERA Corporation, Kyoto (JP)

(72) Inventor: Yoshiaki Itakura, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 411 days.

(21) Appl. No.: 17/915,811

(22) PCT Filed: Mar. 23, 2021

(86) PCT No.: PCT/JP2021/012066
§ 371 (c)(1),
(2) Date: Sep. 29, 2022

(87) PCT Pub. No.: WO2021/200408
PCT Pub. Date: Oct. 7, 2021

(65) Prior Publication Data
US 2023/0168449 A1 Jun. 1, 2023

(30) Foreign Application Priority Data
Mar. 31, 2020 (JP) ................................. 2020-062409

(51) Int. Cl.
*G02B 6/122* (2006.01)
*G02B 6/132* (2006.01)
(Continued)

(52) U.S. Cl.
CPC ............. *G02B 6/122* (2013.01); *G02B 6/132* (2013.01); *G02B 6/42* (2013.01); *G02B 6/43* (2013.01); *G02B 6/4206* (2013.01); *G02B 6/4251* (2013.01)

(58) Field of Classification Search
CPC ........ G02B 6/122; G02B 6/42; G02B 6/4206; G02B 6/4251; G02B 6/43; G02B 6/132;
(Continued)

(56) References Cited

U.S. PATENT DOCUMENTS 6,393,185 B1* 5/2002 Deacon .................... G02B 6/42
385/12
6,981,806 B2* 1/2006 Benzoni ............... G02B 6/4251
385/94
(Continued)

FOREIGN PATENT DOCUMENTS

CN 103698847 B 1/2016
JP 3-265802 A 11/1991
(Continued)

*Primary Examiner* — Daniel Petkovsek
(74) *Attorney, Agent, or Firm* — Volpe Koenig

(57) ABSTRACT

The present disclosure reduces the possibility that a protrusion and a conductor layer will be damaged during the bonding of a lid to an optical waveguide module. An optical waveguide module includes a substrate, a core, a cladding layer, and a conductor layer. The substrate has a first surface. The core extends in a first direction. The cladding layer is disposed on the first surface 1a and extends over and around the core. The conductor layer is disposed on the cladding layer. The cladding layer includes a protrusion, which extends over the core. The protrusion has a second surface, which is covered with the conductor layer. The protrusion includes a portion where the second surface extends along the first surface and is wider than the core.

10 Claims, 7 Drawing Sheets

(51) Int. Cl.
  *G02B 6/42*            (2006.01)
  *G02B 6/43*            (2006.01)
(58) Field of Classification Search
  CPC .............. H01S 5/02208; H01S 5/0225; H01S
        5/02253; H01S 5/4012; H01S 5/4093
  See application file for complete search history.

(56)                    References Cited

U.S. PATENT DOCUMENTS

| | | | | |
|---|---|---|---|---|
| 2004/0052480 | A1* | 3/2004 | Benzoni | G02B 6/4279 |
| | | | | 385/94 |
| 2005/0105868 | A1* | 5/2005 | Arakida | G02B 6/122 |
| | | | | 385/129 |
| 2005/0185909 | A1 | 8/2005 | Bour et al. | |
| 2006/0165340 | A1 | 7/2006 | Wu | |
| 2008/0024873 | A1 | 1/2008 | Kim et al. | |
| 2013/0094801 | A1 | 4/2013 | Morris | |
| 2015/0084145 | A1* | 3/2015 | Iwama | G02B 6/421 |
| | | | | 257/432 |
| 2015/0370016 | A1* | 12/2015 | Kurizoe | G02B 6/1221 |
| | | | | 156/150 |
| 2019/0154756 | A1 | 5/2019 | He et al. | |
| 2019/0372302 | A1* | 12/2019 | Miyata | H01S 5/02255 |

FOREIGN PATENT DOCUMENTS

| | | | |
|---|---|---|---|
| JP | 10-308555 | A | 11/1998 |
| JP | H10-308555 | A | 11/1998 |
| JP | 2006-058858 | A | 3/2006 |
| JP | 2008-542832 | A | 11/2008 |
| JP | 45-79868 | B | 11/2010 |
| JP | 2011-064993 | A | 3/2011 |
| JP | 2019-035876 | A | 3/2019 |
| WO | 2006/129123 | A1 | 12/2006 |

* cited by examiner

OPTICAL WAVEGUIDE MODULE AND LIGHT SOURCE MODULE

TECHNICAL FIELD

The present disclosure relates to an optical waveguide module and a light source module.

BACKGROUND OF INVENTION

A known optical waveguide module includes a substrate, a core, a cladding layer, and a conductor layer. The core extends in a predetermined direction. The cladding layer is disposed on the substrate and extends over and around the core. The conductor layer is disposed on the cladding layer.

In an example of the known optical waveguide module, a region being part of a surface of the cladding layer and extending over the core is flat (see, for example, Patent Literature 1).

In another example of the known optical waveguide module, the cladding layer includes a protrusion extending over the core (see, for example, Patent Literature 2).

CITATION LIST

Patent Literature

Patent Literature 1: Japanese Patent No. 4579868
Patent Literature 2: Japanese Unexamined Patent Application Publication No. 10-308555

SUMMARY

Solution to Problem

According to an aspect of the present disclosure, an optical waveguide module includes a substrate, a core, a cladding layer, and a conductor layer. The substrate has a first surface. The core extends in a first direction. The cladding layer is disposed on the first surface and extends over and around the core. The conductor layer is disposed on the cladding layer. The cladding layer includes a protrusion extending over the core. The protrusion has a second surface covered with the conductor layer and includes a portion where the second surface extends along the first surface and is wider than the core.

According to an aspect of the present disclosure, alight source module includes the optical waveguide module, an electrode, a light-emitting element, and a lid. The electrode is disposed on a first surface of the optical waveguide module. The light-emitting device is disposed on the electrode. The light-emitting device is covered with the lid.

DESCRIPTION OF EMBODIMENTS

Figure 1:
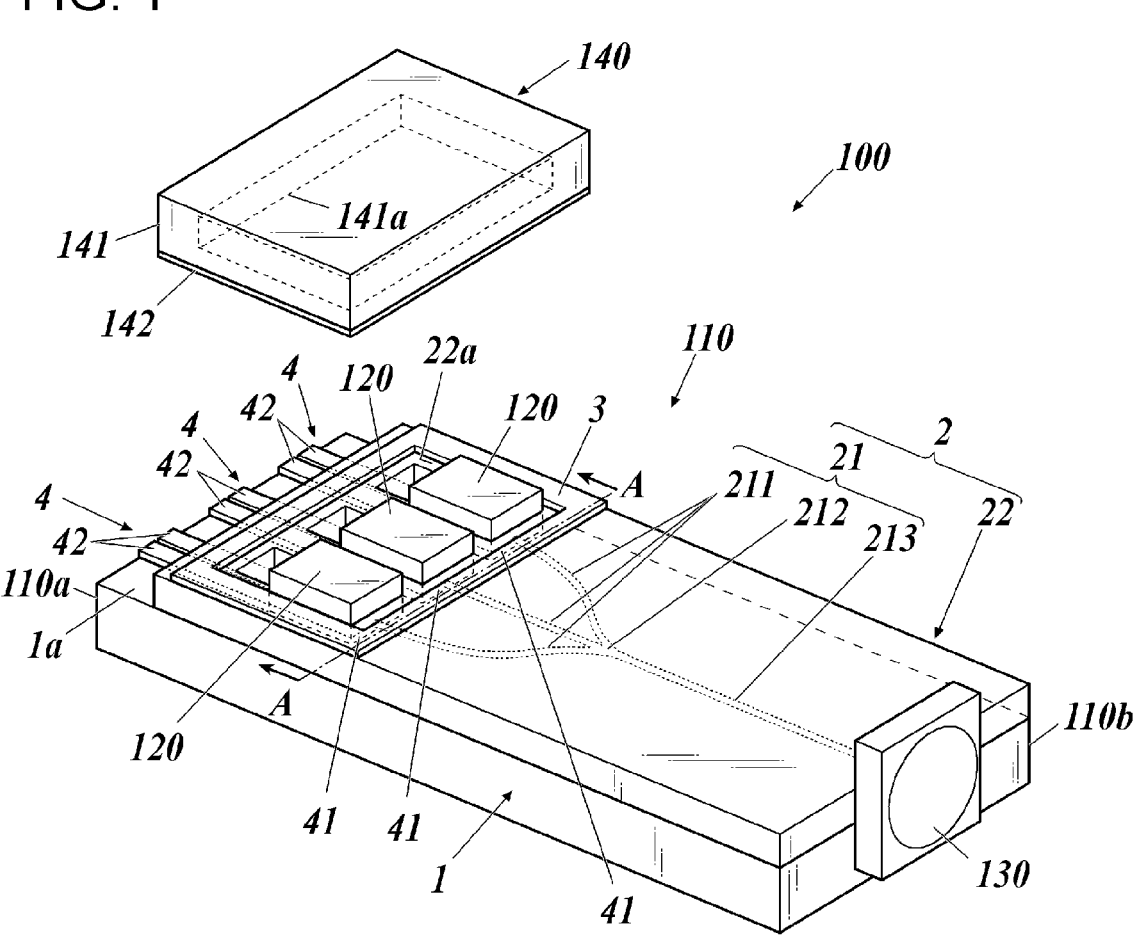
FIG. 1 is an exploded perspective view of a light source module according to an embodiment of the present disclosure.

The manufacturing of the module described in Patent Literature 1 involves the step of removing (e.g., by polishing) a protrusion from a cladding layer formed on a core in the preceding step. The removal of the protrusion developed over the core has been a burden in manufacturing the module described in Patent Literature 1.

The manufacturing of the module described in Patent Literature 2 does not involve the step of removing such a protrusion. On the downside, heat generated by a bonding material during the bonding of a lid to the module causes concentration of thermal stress in the protrusion. The thermal stress can cause damage to the protrusion and/or a conductor layer. More specifically, the protrusion can be cracked, and/or the conductor layer can come off the protrusion.

This problem is averted by an optical waveguide module disclosed herein; that is, the protrusion and the conductor layer are impervious to being damage during the bonding of the lid. The optical waveguide module thus has high reliability and is long-wearing.

Alight source module disclosed herein also has high reliability.

Hereinafter, an embodiment of the present disclosure will be described in detail with reference to the accompanying drawings.

The embodiment and examples illustrated in the drawings should not be construed as limiting the technical scope of the present disclosure.

<1. Configuration of Light Source Module>

The following describes the configuration of a light source module 100 according to an embodiment of the present disclosure.

FIG. 1 is an exploded perspective view of the light source module.

Figure 3:
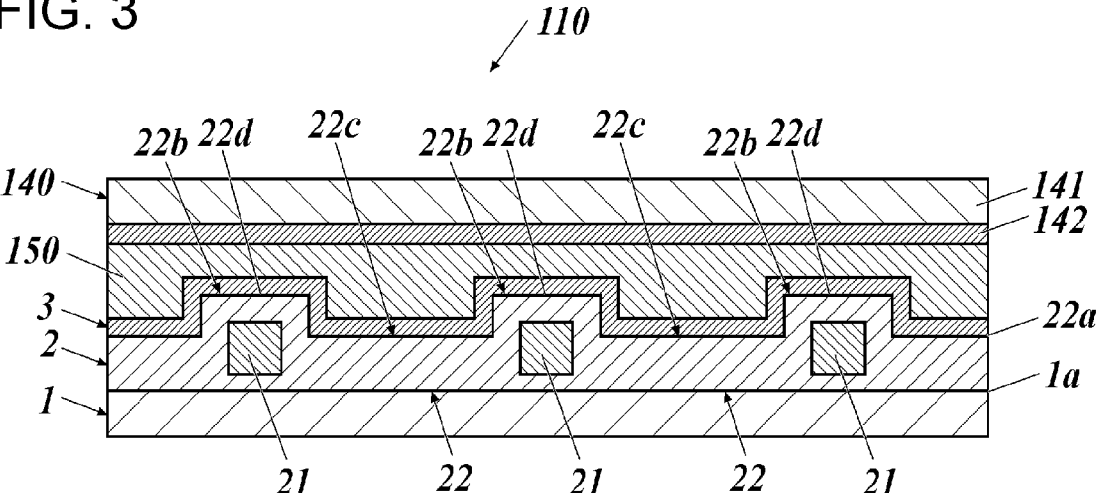
FIGS. 3 to 8 are examples of a sectional view taken along line A-A in FIG. 1.

Referring to FIG. 1, the light source module 100 includes an optical waveguide module 110, light-emitting devices 120, a lens 130, a lid 140, and a bond layer 150 (see FIG. 3).

In the present embodiment, three light-emitting devices 120 are included in the light source module 100.

In some embodiments, one light-emitting device 120, two light-emitting devices 120, or four or more light-emitting devices 120 may be included in the light source module 100.

[1-1. Optical Waveguide Module]

The optical waveguide module 110 includes a substrate 1, an optical waveguide 2, and a conductor layer 3.

In the present embodiment, electrodes 4 are also included in the optical waveguide module 110.

(Substrate)

The substrate 1 has a first surface 1a.

The first surface 1a in the present embodiment is greater than any other surfaces of the substrate 1.

The substrate 1 in the present embodiment is plate-like in shape, and the first surface 1a of the substrate 1 is rectangular.

In some embodiments, the first surface 1a is square or has any other polygonal shape.

(Optical Waveguide)

The optical waveguide 2 is disposed on the first surface 1a of the substrate 1.

The optical waveguide 2 includes a core 21 and a cladding layer 22.

The core 21 extends in a first direction.

The first direction is parallel to the first surface 1*a*. In the present embodiment, the first direction coincides with the longitudinal direction of the substrate 1.

When viewed obliquely, the core 21 extends from the upper left to the lower right in FIG. 1.

Examples of the material of the core 21 include glass (e.g., quartz) and resin.

The core 21 in the present embodiment includes branch paths 211, a wave combining section 212, and an integration path 213.

The branch paths 211 extend from the respective entrance surfaces to the wave combining section 212. The entrance surfaces are denoted by 211*a* (see FIG. 2).

Each of the entrance surface 211*a* lies on a side of the corresponding one of the light-emitting devices 120.

The branch paths 211 merge into one in the wave combining section 212.

Figure 2:
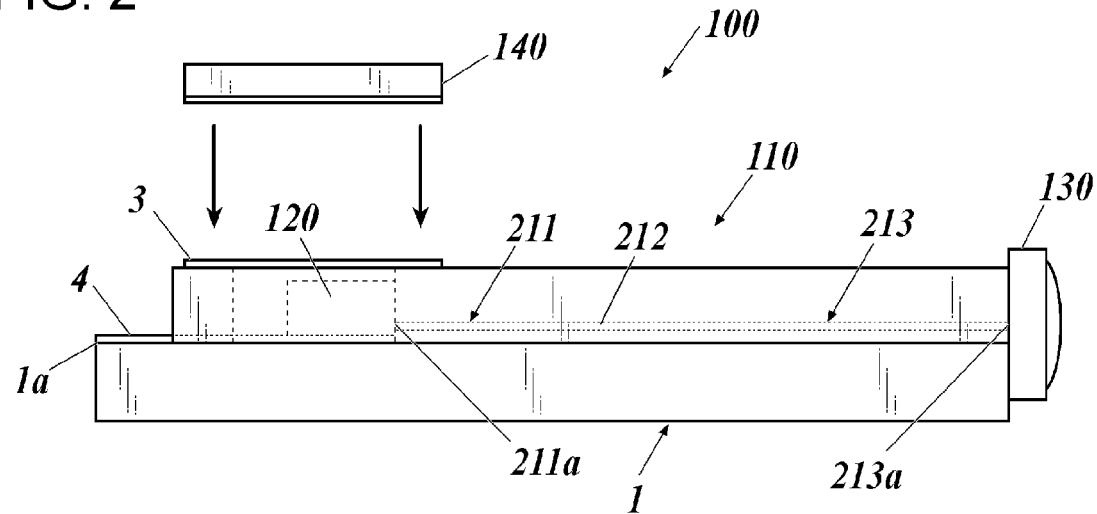
FIG. 2 is a side view of the light source module according to another embodiment of the present disclosure.

The integration path 213 extends from the wave combining section 212 to an exit surface 213*a* (see FIG. 2).

The exit surface 213*a* in the present embodiment lies on the lens 130.

The cladding layer 22 is disposed on the first surface 1*a* of the substrate 1 and extends over and around the core 21. That is, the core 21 is embedded in the cladding layer 22.

The cladding layer 22 extends from a first end 110*a* to a second end 110*b*, where the lens 130 is located.

Examples of the material of the cladding layer 22 include glass (e.g., quartz) and resin.

The refractive index of the cladding layer 22 is lower than that of the core 21.

An example of the cladding layer 22 in the present embodiment is illustrated in FIG. 1, in which a region being part of the first surface 1*a* and including the first end 110*a* opposite the second end 110*b* is not covered with the cladding layer 22; that is, an end portion including the first end 110*a* is exposed at the first surface 1*a*.

The cladding layer 22 includes cavities 22*a*.

Each of the cavities 22*a* of the cladding layer 22 in the present embodiment is provided for the corresponding one of the light-emitting devices 120.

The cavities 22*a* of the cladding layer 22 in the present embodiment are provided in an end portion close to the first end 110*a*.

In the present embodiment, the outline of each of the cavities 22*a* viewed in a direction orthogonal to the first surface 1*a* is rectangular and is a size larger than the outline of a mount section 41 of each electrode 4 or the outline of each light-emitting device 120.

The entrance surface 211*a* of each of the branch paths 211 of the core 21 lies on a wall surface being one of inner wall surfaces of the corresponding one of the cavities 22*a* and being on a side of the second end 110*b*.

(Conductor Layer)

The conductor layer 3 (seal ring) is disposed on the cladding layer 22.

The conductor layer 3 in the present embodiment is in the form of a rectangular frame, and the cavities 22*a* of the cladding layer 22 are located in a region enclosed with the conductor layer 3.

The conductor layer 3 is bonded to the lid 140 with the bond layer 150 (see FIG. 3) therebetween.

(Electrodes)

The electrodes 4 are disposed on the first surface 1*a* of the substrate 1.

Each of the electrodes 4 are provided for the corresponding one of the light-emitting devices 120.

The electrodes 4 each include a mount section and an extended section, which are denoted by 41 and 42, respectively.

Each of the mount sections 41 is located on a region being part of the first surface 1*a* and extending in the corresponding one of the cavities 22*a* of the cladding layer 22.

The extended sections 42 extend from the respective mount sections 41 to the first end 110*a* of the substrate 1. The extended sections 42 extend under the end portion of the cladding layer 22 that is closer than the other end portion of the cladding layer 22 to the first end 110*a*.

An end portion of each extended section 42 is exposed at the first surface 1*a*. More specifically, the end portion is closer than the other end portion of the extended section 42 to the first end 110*a* and is located on an end portion of the first surface 1*a* that is closer than the other end portion of the first surface 1*a* to the first end 110*a*.

[1-2. Light-Emitting Devices]

The light-emitting devices 120 are located in the respective cavities 22*a* of the cladding layer 22.

Each of the light-emitting devices 120 is mounted on the mount section 41 of the corresponding one of the electrodes 4. The light-emitting devices 120 are electrically connected to the respective electrodes 4.

For example, the light-emitting devices 120 are laser diodes.

The three light-emitting devices 120 emit red light, green light, and blue light, respectively. The light-emitting device that emits red light is hereinafter referred to as a red-light-emitting device 120R. The light-emitting device that emits green light is hereinafter referred to as a green-light-emitting device 120G. The light-emitting device that emits blue light is hereinafter referred to as a blue-light-emitting device 120B.

[1-3. Lens]

The lens 130 is fitted to the second end 110*b* of the optical waveguide module 110.

The lens 130 lies on the exit surface 213*a* of the integration path 213 of the core 21.

[1-4. Lid]

The lid 140 may include a main body 141 and a second conductor layer 142.

The outline of the main body 141 viewed in a direction orthogonal to the first surface 1*a* is rectangular and is substantially coincides with the outline of the conductor layer 3.

The main body 141 includes a recess 141*a*, which is located in the midsection of a surface oriented toward substrate 1.

The second conductor layer 142 is located on the surface of the main body 141, that is, on the surface oriented toward the substrate 1.

The second conductor layer 142 in the present embodiment is in the form of a rectangular frame and extends along the peripheral edge of the surface of the main body 141, that is, along the peripheral edge of the surface oriented toward the substrate 1.

The second conductor layer 142 is bonded to the conductor layer 3 of the optical waveguide module 110, with the bond layer 150 (see FIG. 3) being located between the second conductor layer 142 and the conductor layer 3.

[1-5. Bond Layer]

The bond layer 150 may be obtained by hardening a bonding material.

The bonding material may be a metallic material, such as Au or Sn, or may be a glass material.

The bond layer 150 is in close contact with both the conductor layer 3 of the optical waveguide module 110 and with the second conductor layer 142 of the lid 140. The lid 140 is joined to the optical waveguide module 110 accordingly.

[1-6. Other Particulars]

The light source module 100 may be as illustrated in FIG. 2, in which the height of each light-emitting device 120 (the distance between the first surface 1a and the surface of the light-emitting device 120 that is farther than any other surfaces of the light-emitting device 120 from the substrate 1) is less than the height of the conductor layer 3 (the distance between the first surface 1a and the surface of the conductor layer 3 that is farther than any other surfaces of the substrate 1 from the substrate 1).

In this case, the lid 140 may be in the form of a flat plate; that is, it is not required that the recess 141a be provided in the lid 140.

[1-7. Workings of Light Source Module]

Each of the light-emitting devices 120R, 120G, and 120B emits light when a predetermined voltage is applied to the extended section 42 of the corresponding one of the electrodes 4.

Red light, green light, and blue light emitted respectively by the light-emitting devices 120R, 120G, and 120B are incident on the respective entrance surfaces 211a and enter the respective branch paths 211.

As mentioned above, the refractive index of the cladding layer 22 is lower than that of the core 21. The light in each branch path 211 is totally reflected at an interface between the branch path 211 and the cladding layer 22. Thus, the light is trapped in the branch path 211 while passing through branch path 211.

The rays of light are then combined into one in the wave combining section 212.

The light is then totally reflected while passing through the integration path 213. The light is eventually emitted from the exit surface 213a.

The light emitted from the exit surface 213a passes through the lens 130 and is then radiated outwards.

<2. Features of Optical Waveguide Module>

The following describes features of the optical waveguide module 110 included in the light source module 100.

FIG. 3 is an example of a sectional view of the optical waveguide module taken along line A-Ain FIG. 1 and illustrates a state after the lid 140 is bonded to the optical waveguide module. FIGS. 4 to 8 and FIGS. 10 to 15 are other examples of the sectional view of the optical waveguide module taken long line A-Ain FIG. 1. FIG. 9 is a plan view of part of the light source module 100.

[2-1. Shape of Cladding layer Viewed in Section]

As mentioned above, the cladding layer 22 is disposed on the first surface 1a and extends over and around the core 21.

The cladding layer 22 includes a protrusion 22b, which extends over the core 21 (see FIG. 3).

The rest of the cladding layer 22, that is, the portion that does not extend over the core 21 is flat and is hereinafter referred to as a flat portion 22c.

The protrusion 22b is farther than the flat portion 22c from the substrate 1.

The protrusion 22b has a second surface 22d, which is covered with the conductor layer 3.

The protrusion 22b includes a portion where the second surface 22d extends along the first surface 1a and is wider than the core 21.

It is not always required that the second surface 22d be parallel to the first surface 1a. The inclination of the second surface 22d from the first surface 1a is allowed in the range of ±2.

Referring to FIG. 3, the second surface 22d is the entirety of the top of the protrusion 22b viewed in section.

There are variation patterns in the shape of the protrusion 22b viewed in section.

The variation patterns will be described below one by one.

(Variation Pattern 1)

Figure 4:
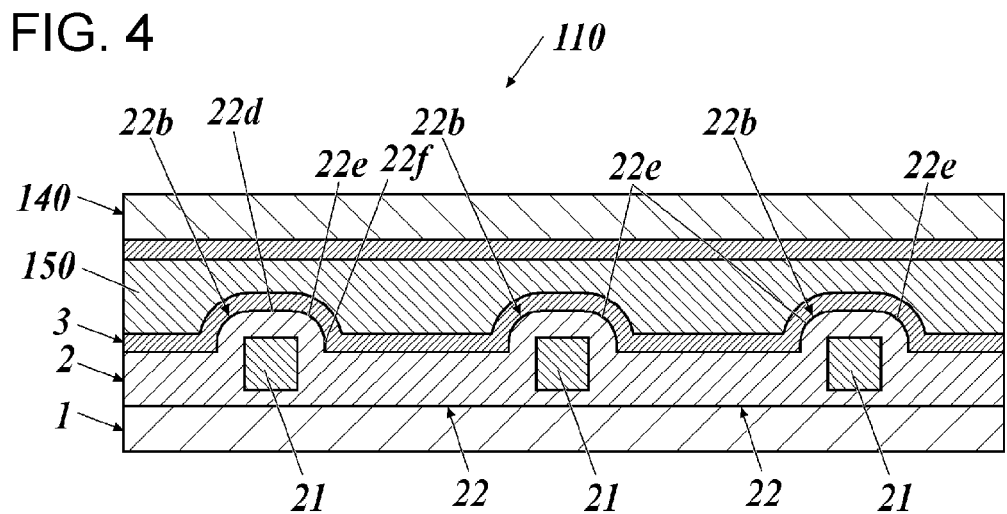

FIG. 4 illustrates Variation Pattern 1, in which a corner 22e of the protrusion 22b in a sectional view taken along a line orthogonal to the first direction is curved outward.

The corner 22e of the protrusion 22b is a place where the second surface 22d and a third surface 22f meet. The third surface 22f is a side extending away from the substrate 1.

The corner 22e in Variation Pattern 1 is curved outward and away from the core 21.

(Variation Pattern 2)

Figure 5:
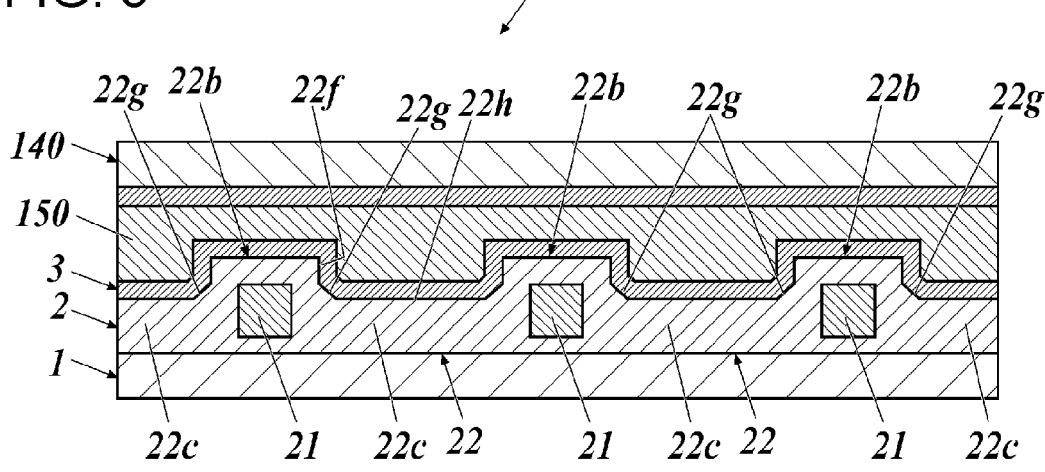

FIG. 5 illustrates Variation Pattern 2, in which the protrusion 22b includes a raised portion 22g. The raised portion 22g is a place where the protrusion 22b is widened toward the substrate 1.

The third surface 22f and a fourth surface 22h meet in the raised portion 22g. The fourth surface 22h is a surface of the flat portion 22c and is covered with the conductor layer 3.

In other words, part of the third surface 22f of the protrusion 22b in Variation Pattern 2 forms a slope.

In the present embodiment, the raised portion 22g is smoothly connected to the third surface 22f and the fourth surface 22h.

(Variation Pattern 3)

Figure 6:
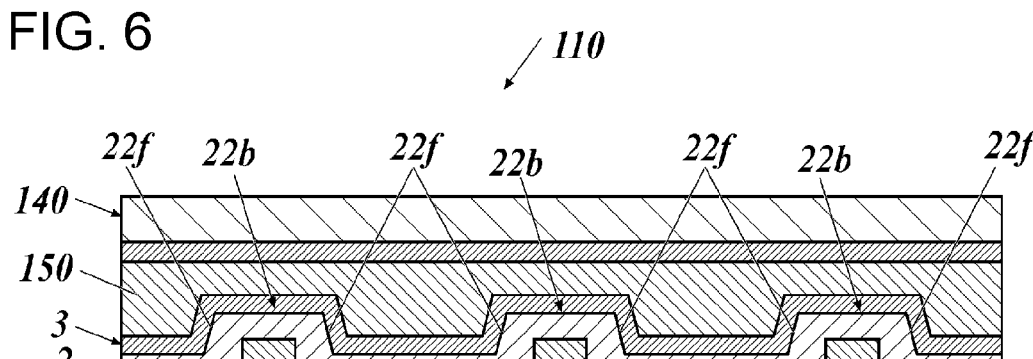

FIG. 6 illustrates Variation Pattern 3, in which the third surface 22f forms a slope where the protrusion 22b is widened toward the substrate 1.

In other words, the entirety of the third surface 22f of the protrusion 22b in Variation Pattern 3 forms a slope.

Adopting any of Variation Patterns 1 to 3 in the shape of the protrusion 22b enables a reduction in the thickness variance of the bond layer 150 such that stress exerted at the time of the bonding of the lid 140 to the optical waveguide module 110 is kept from concentrating in the corner 22e.

Thus, the conductor layer 3 is impervious to being damaged.

In addition to that, gaps between the protrusion 22b and the conductor layer 3 and gaps between the conductor layer 3 and the bond layer 150 are less likely be formed in the corner 22e.

(Variation Pattern 4)

Figure 7:
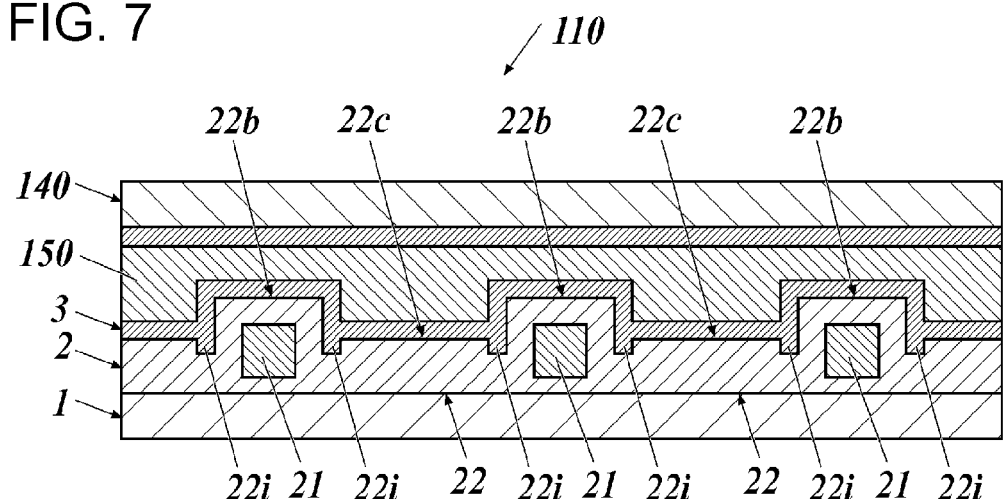

FIG. 7 illustrates Variation Pattern 4, in which the cladding layer 22 includes a recess 22i on the verge of a protruding portion of the protrusion 22b (i.e., over the boundary between the protrusion 22b and the flat portion 22c).

In Variation Pattern 4, the conductor layer 3 is caught in the recess 22i.

When the conductor layer 3 is caught in the recess 22i, the conductor layer 3 is less likely to come off the cladding layer 22.

(Variation Pattern 5)

Figure 8:
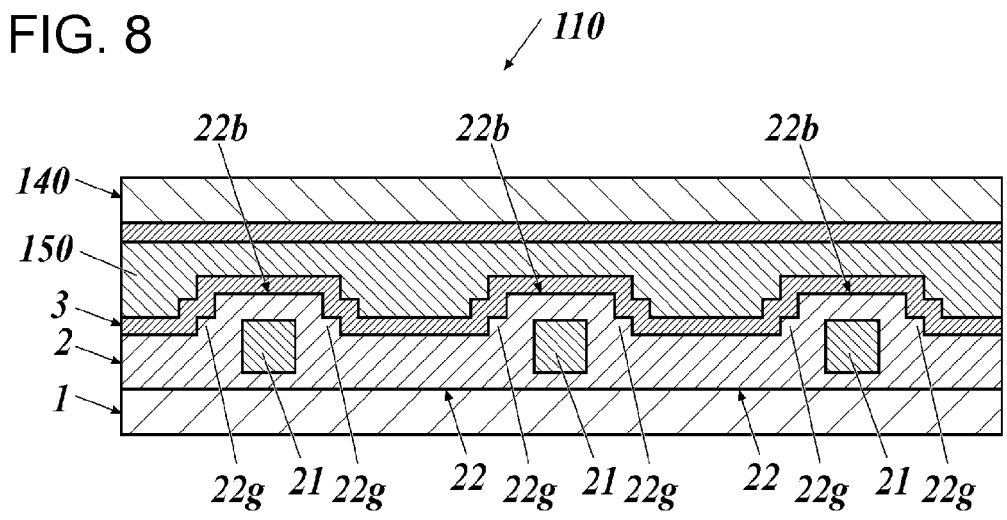
Figure 9:
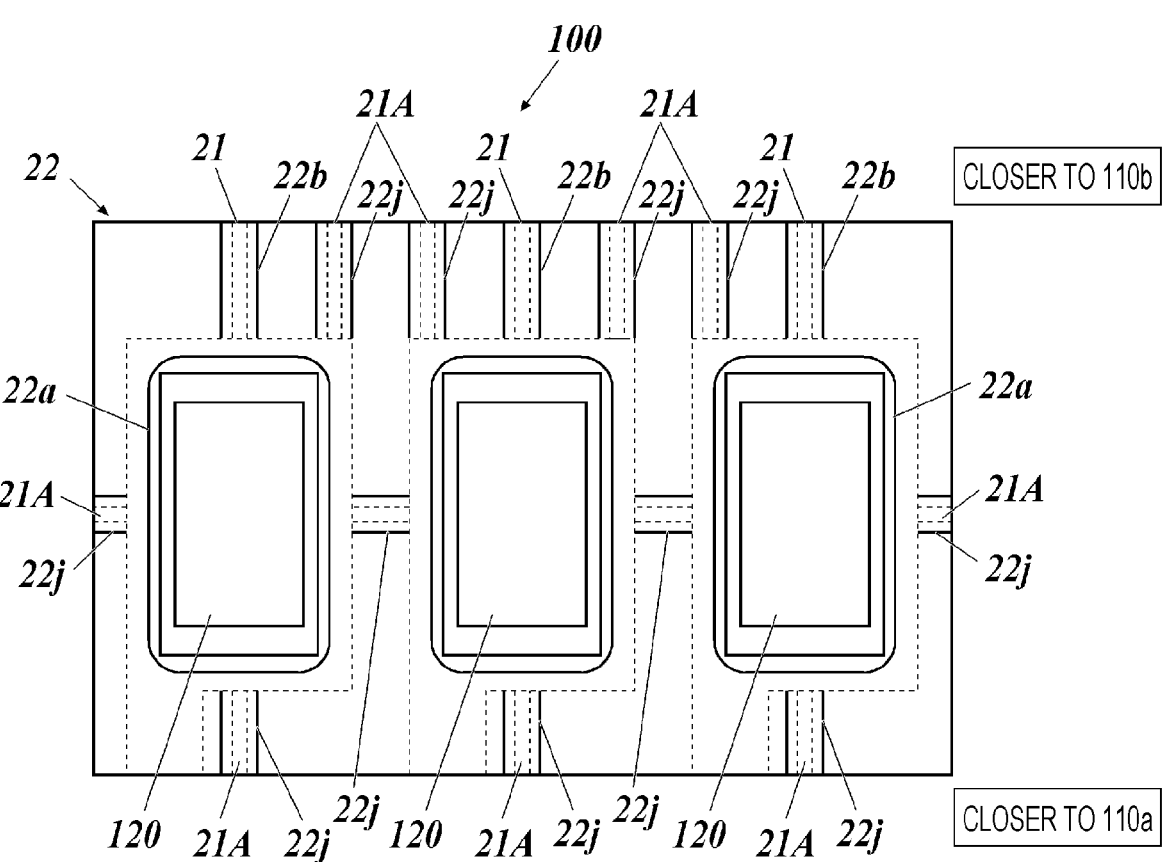
FIG. 9 is a plan view of part of the light source module according to the another embodiment.

FIG. 8 illustrates Variation Pattern 5, in which the raised portion 22g of the protrusion 22b is a step.

More specifically, a region being part of the third surface 22f and located on the raised portion 22g extends along the first surface 1a and away from the core 21.

The step yields an increase in the area of contact between the protrusion 22*b* and the conductor layer 3. Thus, the conductor layer 3 is less likely to come off.

(Variation Pattern 6)

FIG. 9 illustrates Variation Pattern 6, in which the cladding layer 22 includes a protrusion extending at least beside the light-emitting devices 120. To make protrusions distinguishable from each other, the protrusion 22*b* extending over the core 21 is referred to as a first protrusion 22*b*, and the protrusion extending at least beside the light-emitting devices 120 is referred to as a second protrusion 22*j*.

The first protrusion 22*b* extends in the first direction from each cavity 22*a* of the cladding layer 22 or, more specifically, from an end of the cavity 22*a* that is closer than the other end of the cavity 22*a* to the second end 110*b*. Meanwhile, the second protrusion 22*j* preferably extends in a direction opposite the first direction from the other end of each cavity 22*a*, that is, from an end closer to the first end 110*a* than to the second end 110*b*.

Owing to this feature, thermal stress exerted at the time of the bonding of the lid 140 is dispersed to a greater extent than would be possible with the first protrusion 22*b* only.

The second protrusion 22*j* may extend parallel to the first protrusion 22*b* as illustrated in FIG. 9 or may extend in a direction orthogonal to the first protrusion 22*b*.

[2-2. Shape of Conductor Layer Viewed in Section]

Referring to FIGS. 3 to 8, the conductor layer 3 is shaped in conformance with the surface of the cladding layer 22; however, that is not necessarily the case.

There are variation patterns in the shape of the conductor layer 3 viewed in plan.

The variation patterns will be described below one by one.

Although the following describes examples in which the shape of the protrusion 22*b* viewed in section is analogous to the shape illustrated in FIG. 3, the variation patterns in the shape of the conductor layer 3 may be combined with the variation patterns in the shape of the protrusion 22*b* that have been described above with reference to FIGS. 4 to 8.

(Variation Pattern A)

Figure 10:
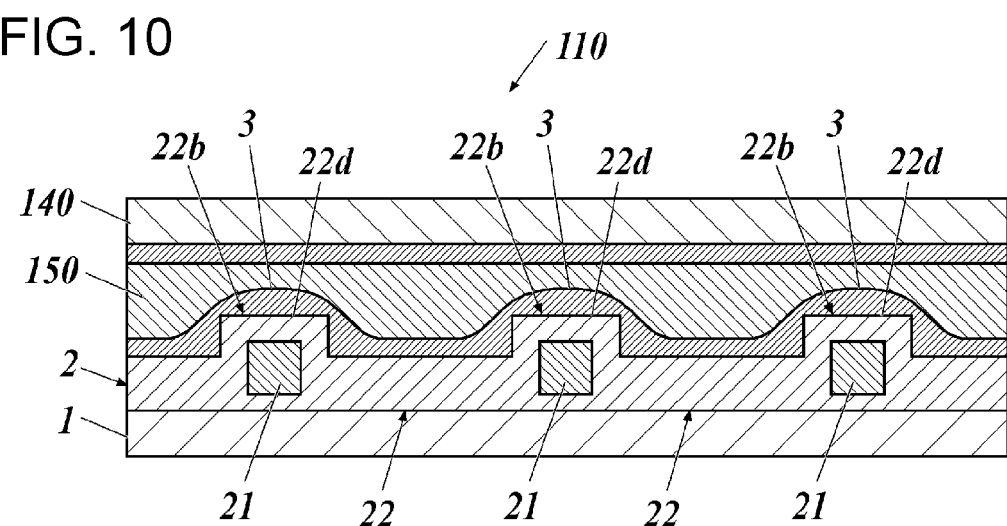
FIGS. 10 to 15 are other examples of the sectional view taken along line A-A in FIG. 1.

FIG. 10 illustrates Variation Pattern A, in which a region being part of the conductor layer 3 and extending over the second surface 22*d* of the protrusion 22*b* is curved outward.

(Variation Pattern B)

Figure 11:
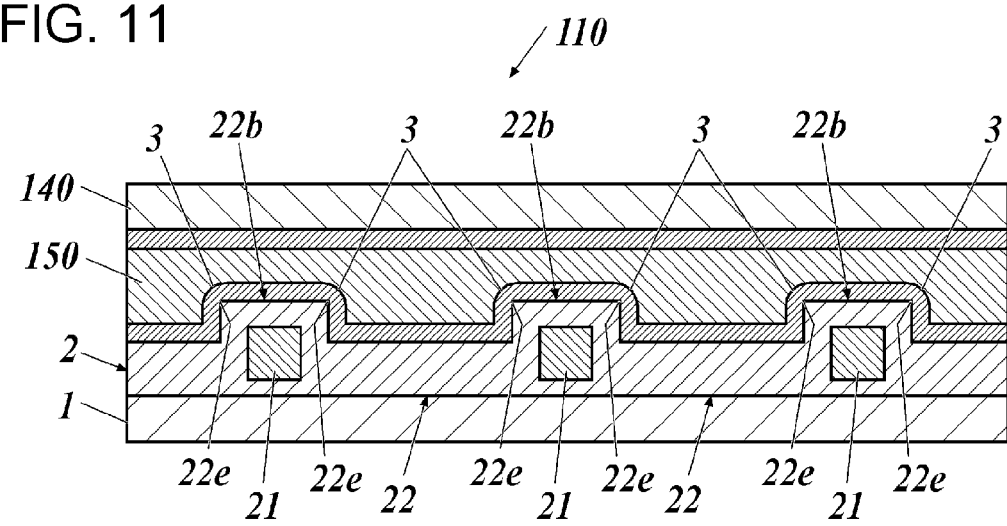

FIG. 11 illustrates Variation Pattern B, in which a region being part of the conductor layer 3 and extending over the corner 22*e* of the protrusion 22*b* is curved outward.

(Variation Pattern C)

Figure 12:
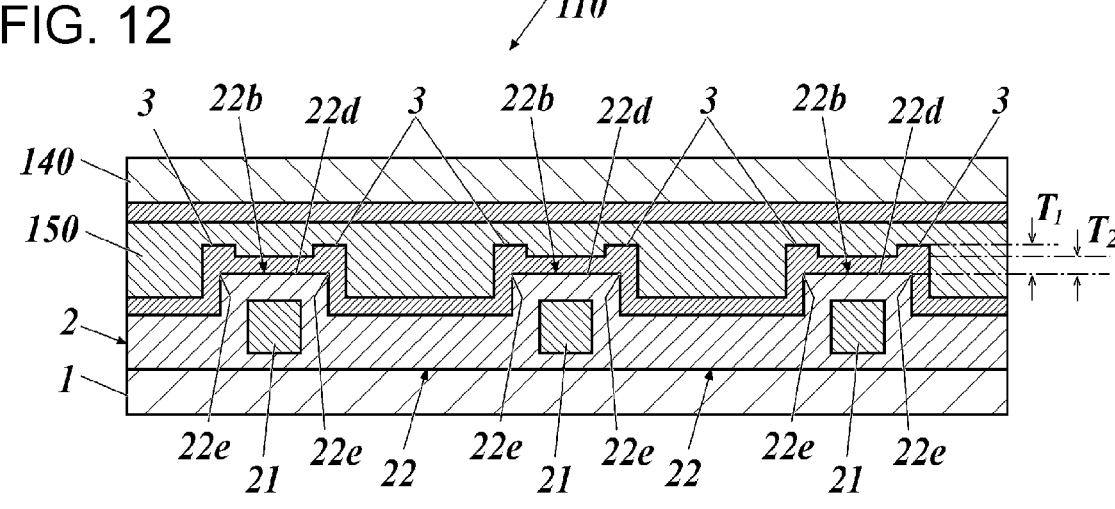

FIG. 12 illustrates Variation Pattern C, in which $T_1$ is greater than $T_2$. $T_1$ denotes the thickness of a region being part of the conductor layer 3 and extending over the corner 22*e* of the protrusion 22*b*. $T_2$ denotes the thickness of a region being part of the conductor layer 3 and extending over the second surface 22*d*.

(Variation Pattern D)

Figure 13:
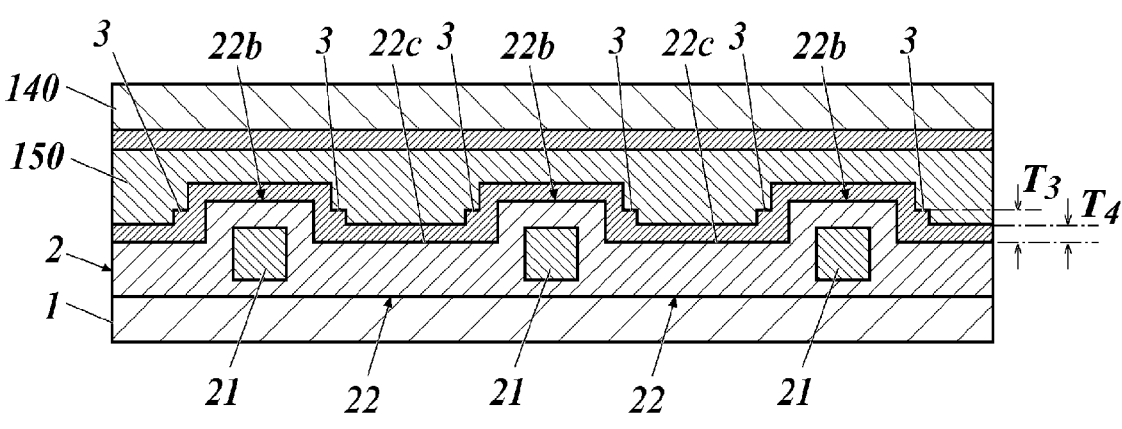

FIG. 13 illustrates Variation Pattern D, in which $T_3$ is greater than $T_4$. $T_3$ denotes the thickness of a region being part of the conductor layer 3 and extending over the verge of the protruding portion of the protrusion 22*b* (the boundary between the protrusion 22*b* and the flat portion 22*c*). $T_4$ denotes the thickness of a region being part of the conductor layer 3 and extending over the flat portion 22*c* of the cladding layer 22. The flat portion 22*c* is not included in the protrusion 22*b*; that is, the flat portion 22*c* is adjacent to the raised portion 22*g*.

(Variation Pattern E)

Figure 14:
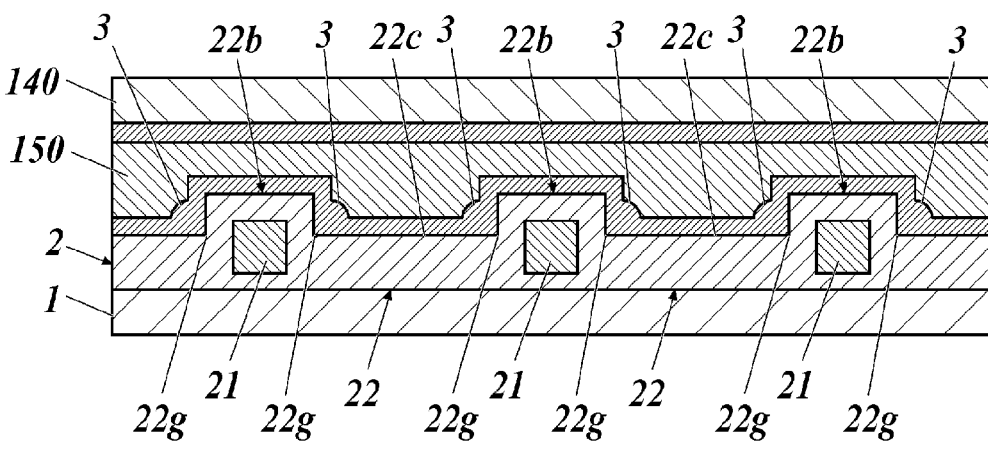

FIG. 14 illustrates Variation Pattern E, in which a region being part of the conductor layer 3 and extending over the verge of the protruding portion of the protrusion 22*b* is curved outward.

(Variation Pattern F)

Figure 15:
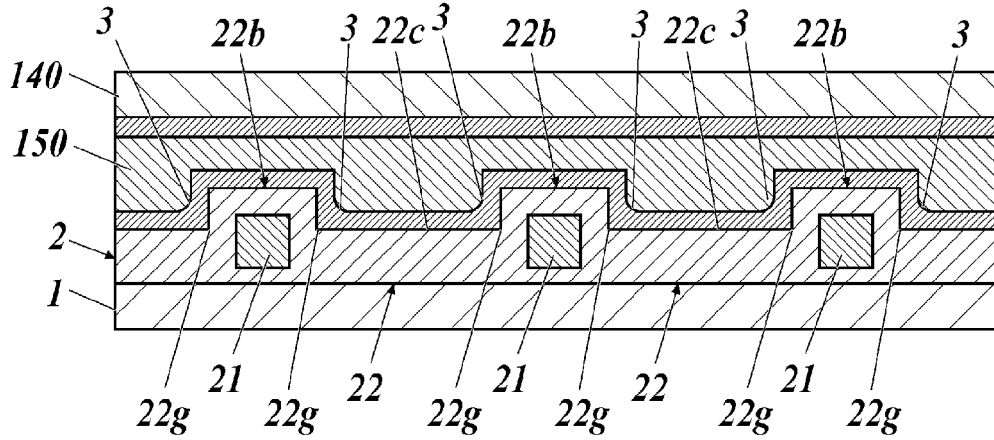

FIG. 15 illustrates Variation Pattern F, in which a region being part of the conductor layer 3 and extending over the verge of the protruding portion of the protrusion 22*b* is curved inward.

<3. Method for Manufacturing Optical Waveguide Module>

The following describes a method for manufacturing the optical waveguide module 110.

FIGS. 16A to 16E are sectional views of the optical waveguide module 110 in the process of being manufactured.

The method for manufacturing the optical waveguide module 110 according to the present embodiment includes a first cladding layer forming step, a core forming step, a second cladding layer forming step, a smoothing step, a cavity forming step, and a conductor layer forming step.

(First Cladding layer Forming Step)

Figure 16A:
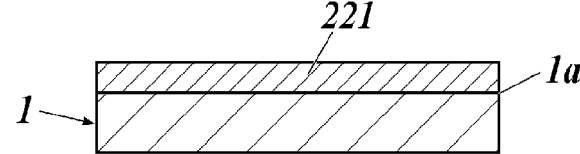
FIGS. 16A to 16E are sectional views of an optical waveguide module in the process of being manufactured, where the optical waveguide module is to be included in the light source module illustrated in FIG. 1.

FIG. 16A illustrates the first cladding layer forming step, in which a first cladding layer 221 is formed on the first surface 1*a* of the substrate 1, with the electrodes 4 being disposed on the first surface 1*a*. The first cladding layer 221 is part of the cladding layer 22.

(Core Forming Step)

The step of forming the first cladding layer 221 on the substrate 1 is followed by the core forming step.

Figure 16B:
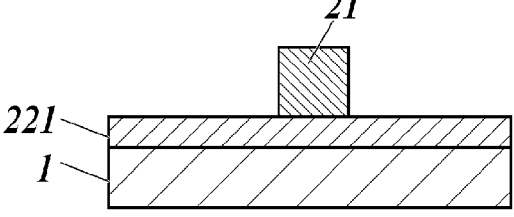

FIG. 16B illustrates the core forming step, in which the core 21 is formed on a surface of the first cladding layer 221.

The details of the core forming step are as follows. The surface of the first cladding layer 221 is entirety covered with a core layer.

Unwanted portions are then removed from the core layer by, for example, etching.

The core layer left unremoved is the core 21.

In a case in which the second protrusion 22*j* is to be provided in the optical waveguide module 110, the core forming step includes forming a dummy core 21A in a region where the second protrusion 22*j* is to be formed.

This facilitates forming the second protrusion 22*j* in the second cladding layer forming step, which will be described later.

The core 21 and the dummy core 21A may be made of the same material or may be made of different materials.

When the core 21 and the dummy core 21A are made of the same material, the degrees of thermal expansion of the core 21 and the dummy core 21A are matched. This feature eliminates or reduces the possibility that stress will concentrate in part of the cladding layer 22 due to nonuniformity in thermal expansion.

(Second Cladding layer Forming Step)

The step of forming the core 21 is followed by the second cladding layer forming step.

Figure 16C:
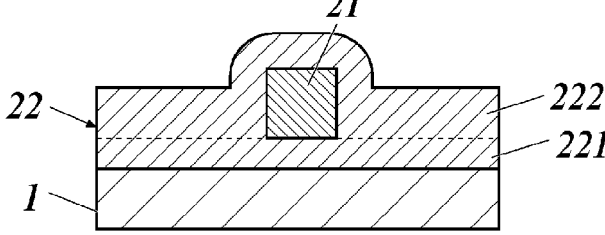

FIG. 16C illustrates the second cladding layer forming step, in which the first cladding layer 221 and the core 21 are overlaid with a second cladding layer 222.

The second cladding layer 222 formed in this step and the first cladding layer 221 constitute the cladding layer 22.

A region being part of the second cladding layer 222 and extending over the core 21 is the protrusion 22*b*.

The second cladding layer 222 is thinner than it used to be. To that end, the manufacturing method in the present embodiment involves forming the second cladding layer 222 over an extended period of time or at a higher speed.

Consequently, the second surface 22*d* of the protrusion 22*b* becomes wider than the core 21.

(Smoothing Step)

The step of forming the second cladding layer 222 is followed by the smoothing step.

Figure 16D:
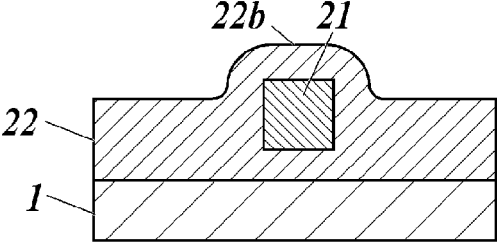

FIG. 16D illustrates the smoothing step, in which the entire surface of the protrusion 22*b* (including the second surface 22*d*, the third surface 22*f*, and the corner 22*e* and the raised portion 22*g* of the protrusion 22*b*) is smoothed.

More specifically, the entire surface of the cladding layer 22 including the protrusion 22*b* is subjected to blasting or wet etching.

This process is easier than removing the protrusion 22*b* by polishing.

In a case in which any of the variation patterns is adopted to the shape of the protrusion 22*b* viewed in section, the protrusion 22*b* is cut into a desired shape when undergoing the smoothing step.

(Cavity Forming Step)

The step of forming the second cladding layer 222 or the step of smoothing the entire surface of the protrusion 22*b* is followed by the cavity forming step.

In the cavity forming step, the cavities 22*a* (see FIG. 1) are formed in part of the cladding layer 22, which includes the first cladding layer 221 and the second cladding layer 222 stacked on the first cladding layer 221.

(Conductor Layer Forming Step)

The step of forming the cavities 22*a* in the cladding layer 22 is followed by the conductor layer forming step.

Figure 16E:
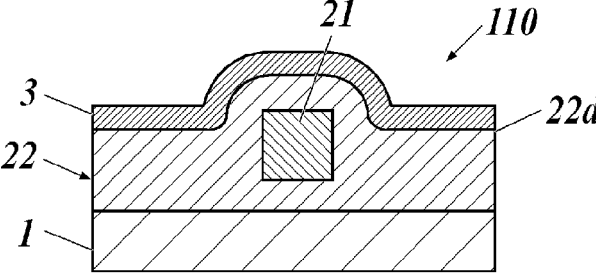

FIG. 16E illustrates the conductor layer forming step, in which the conductor layer 3 is formed on the second surface 22*d* of the cladding layer 22 in such a manner that the cavities 22*a* are located in a region enclosed with the conductor layer 3.

More specifically, the conductor layer 3 is formed by, for example, plating or sputtering.

In a case in which any of the variation patterns is adopted to the shape of the conductor layer 3 viewed in section, the conductor layer forming step involves, for example, adjustment of the direction in which metal atoms are ejected from a sputtering target.

This is how the optical waveguide module 110 is manufactured.

<4. Effects>

The optical waveguide module 110 according to the present embodiment has been described so far. The optical waveguide module 110 and the light source module 100 including the optical waveguide module 110 can be manufactured without the need to remove the protrusion.

Where the optical waveguide module 110 and the light source module 100 are concerned, the present embodiment reduces the possibility that thermal stress caused by heat of the bonding material will concentrate in the protrusion 22*b*.

The present embodiment saves time and effort in manufacturing the light source module 100. The protrusion 22*b* and the conductor layer 3 are impervious to being damage during the bonding of the lid 140. The light source module 100 thus has high reliability and is long-wearing.

Where the optical waveguide module 110 and the light source module 100 are concerned, the present embodiment reduces the thermal stress exerted on the protrusion 22*b* and thus eliminates or reduces the possibility of deformation of the core 21 and the possibility of displacement of the optical axis. Thus, the optical waveguide module 110 and the light source module 100 according to the present embodiment can operate without deterioration in light transmission efficiency.

INDUSTRIAL APPLICABILITY

The present disclosure is applicable to optical waveguide modules and light source modules.

REFERENCE SIGNS

| | | | |
|---|---|---|---|
| 100 | light source module | | |
| | 110 | optical waveguide module | |
| | | 1 | substrate |
| | 1a | first surface | |
| | 2 | optical waveguide | |
| | 21 | core | |
| | | 211 | branch path |
| | | | 211a entrance surface |
| | | 212 | wave combining section |
| | | 213 | integration path |
| | | | 213a exit surface |
| | 21A | dummy core | |
| | 22 | cladding layer | |
| | | 22a | cavity |
| | | 22b | protrusion (first protrusion) |
| | | 22c | flat portion |
| | | 22d | second surface |
| | | 22e | corner |
| | | 22f | third surface |
| | | 22g | raised portion |
| | | 22h | fourth surface |
| | | 22i | recess |
| | | 22j | second protrusion |
| | | 221 | first cladding layer |
| | | 222 | second cladding layer |
| | 3 | conductor layer | |
| | 4 | electrode | |
| | | 41 | mount section |
| | | 42 | extended section |
| | 120 | light-emitting device | |
| | | 120B | blue-light-emitting device |
| | | 120G | green-light-emitting device |
| | | 120R | red-light-emitting device |
| | 130 | lens | |
| | 140 | lid | |
| | | 141 | main body |
| | | | 141a recess |
| | | 142 | second conductor layer |
| | 150 | bond layer | |

The invention claimed is:

1. An optical waveguide module, comprising:

a substrate having a first surface;

a core extending in a first direction;

a cladding layer disposed on the first surface and extending over and around the core, the cladding layer comprising:

a first protrusion extending over the core, a flat portion located on a surface of the cladding layer and spaced from the core when viewed from a second direction perpendicular to the first surface of the substrate, a recess located on a boundary between the first protrusion and the flat portion and connecting the first protrusion and the flat portion, and a cavity; and a conductor layer disposed from the flat portion to the first protrusion and around the cavity, and wherein an apex of the first protrusion is higher than the flat portion in the second direction perpendicular to the first surface of the substrate.

2. The optical waveguide module according to claim 1, wherein the conductor layer is shaped in conformance with the surface of the cladding layer.

3. The optical waveguide module according to claim 1, wherein the cladding layer comprises a second protrusion extending in a third direction different from the first direction.

4. A light source module, comprising:

the optical waveguide module according to claim 1;

an electrode;

a light-emitting device disposed on the electrode; and a lid covering the light-emitting device.

5. The light source module according to claim 4, wherein the light-emitting device comprises a red-light-emitting device, a green-light-emitting device, and a blue-light-emitting device.

6. The optical waveguide module according to claim 1, wherein a part of the conductor layer is located in the recess.

7. The optical waveguide module according to claim 1, wherein the first protrusion is wider than the core, and the core is located in a portion of the cladding layer created by the first protrusion and the recess.

8. The optical waveguide module according to claim 1, wherein the core includes a first side that is a side parallel to the first surface of the substrate and the side of the core furthest away from the first surface of the substrate, and wherein a distance between the flat portion and the first surface of the substrate is smaller than a distance between the first side of the core and the first surface of the substrate.

9. The optical waveguide module according to claim 1, wherein a bottom of the core is located closer to the first surface of the substrate than a bottom of the recess is located.

10. The optical waveguide module according to claim 1, wherein the core is located within the cladding layer and when viewed in the second direction, a first side of the core is furthest from the substrate is closer to the first protrusion, the recess is located on either a second side or a third side of the core, wherein the second side and the third side are parallel to each other and are each perpendicular to the first side, and wherein a bottom of the core is located closer to the first surface of the substrate than a bottom of the recess is located.

* * * * *